United States Patent [19]
Kawada et al.

[11] Patent Number: 5,481,413
[45] Date of Patent: Jan. 2, 1996

[54] MAGNETIC RECORDING AND REPRODUCING APPARATUS FOR A HELICAL-SCAN SYSTEM ADAPTED FOR REPRODUCTION OF DATA IN A REVERSE SEQUENTIAL ORDER FROM RECORDING OF DATA

[75] Inventors: Hideaki Kawada; Toshiaki Wakita, both of Kanagawa, Japan

[73] Assignee: Sony Corporation, Tokyo, Japan

[21] Appl. No.: 436,833

[22] Filed: May 8, 1995

Related U.S. Application Data

[63] Continuation of Ser. No. 143,478, Oct. 26, 1993, abandoned.

[30] Foreign Application Priority Data

Oct. 27, 1992 [JP] Japan ........................... 4-289078
Nov. 20, 1992 [JP] Japan ........................... 4-335261

[51] Int. Cl.[6] ............................................. G11B 5/09
[52] U.S. Cl. ...................................................... 360/53
[58] Field of Search ................... 360/53, 32, 51, 360/10.1, 36.1, 37.1; 375/113, 114; 358/335

[56] References Cited

U.S. PATENT DOCUMENTS

5,051,848  9/1991  Ishii et al. ........................... 360/64
5,060,077  10/1991  Kapi et al. ........................ 358/335
5,175,631  12/1992  Juri et al. .......................... 358/335
5,179,451  1/1993  Takeshita et al. ................. 358/335
5,191,437  3/1993  Kim ................................... 358/337
5,302,949  4/1994  Yoshinari ........................... 341/67

*Primary Examiner*—Donald T. Hajec
*Assistant Examiner*—Thien Minh Le
*Attorney, Agent, or Firm*—Jay H. Maioli

[57] ABSTRACT

A device that records and reproduces data using a tape driver and a tape guide drum with an angled rotary magnetic head for forming helical slant tracks for high density recording provides reverse data reproduction and synchronization, regardless of the helical-scanning system used for recording and reproduction, and accommodates error correction codes, to rapidly and accurately reproduce data at various speeds, formats, and error correction codes. The tape guide drum can rotate in both forward and reverse, so that access time is minimized because the tape needs no rewinding prior to playback. The capabilities of reverse direction playback, of handling data other than video data, and of reproducing data at arbitrary speeds provide flexibility for many applications, including a satellite's requirements for rapid, variable-speed playback and transmission of high-density, non-video data.

9 Claims, 10 Drawing Sheets

Artificial Satellite
(Landsat, Etc.)

Ground Station

MAGNETIC RECORDING AND REPRODUCING APPARATUS FOR A HELICAL-SCAN SYSTEM ADAPTED FOR REPRODUCTION OF DATA IN A REVERSE SEQUENTIAL ORDER FROM RECORDING OF DATA

This is a continuation of application Ser. No. 08/143,478 filed Oct. 26, 1993, now abandoned.

BACKGROUND OF THE INVENTION

1. Field of the Invention

The present invention relates to a magnetic recording and reproducing apparatus which includes a tape transport driving means and a tape guide drum housing therein a rotary magnetic head for forming slant tracks on a magnetic tape and on which the magnetic tape is wrapped in a predetermined angular extent. Also, the present invention relates to a data recording apparatus for recording data on a magnetic tape in a so-called helical-scan system and a reproducing method thereof.

2. Description of the Prior Art

In conventional magnetic recording and reproducing apparatus, a magnetic tape can be transported in the positive and opposite directions but a tape guide drum is rotated only in one direction.

Figure 1:
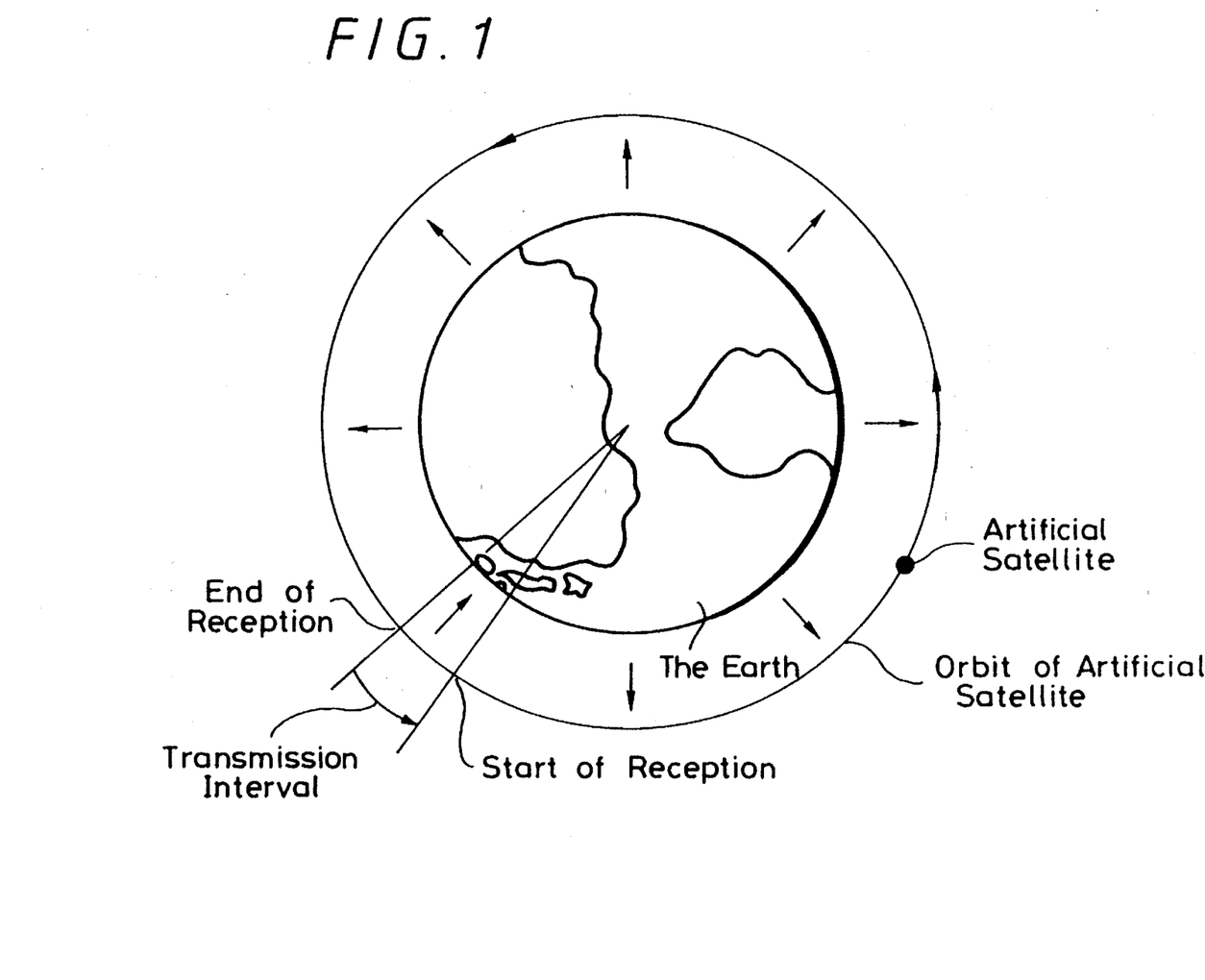
FIG. 1 is a diagram used to explain data recording/reproducing and data transmission by an artificial satellite.

Also, as shown in FIG. 1, consider the case of an artificial satellite orbiting the earth that starts receiving data transmitted from the surface of the earth from a certain point over Japan, records received data by using the above-mentioned magnetic recording and reproducing apparatus, ends the reception and the recording at another point over Japan a little before the artificial satellite goes round the earth and transmits the received data thus recorded to a ground station in Japan in a short period of time in which the artificial satellite orbits from point to another certain point over Japan as shown in FIG. 1 of the accompanying drawings.

Figure 2A:
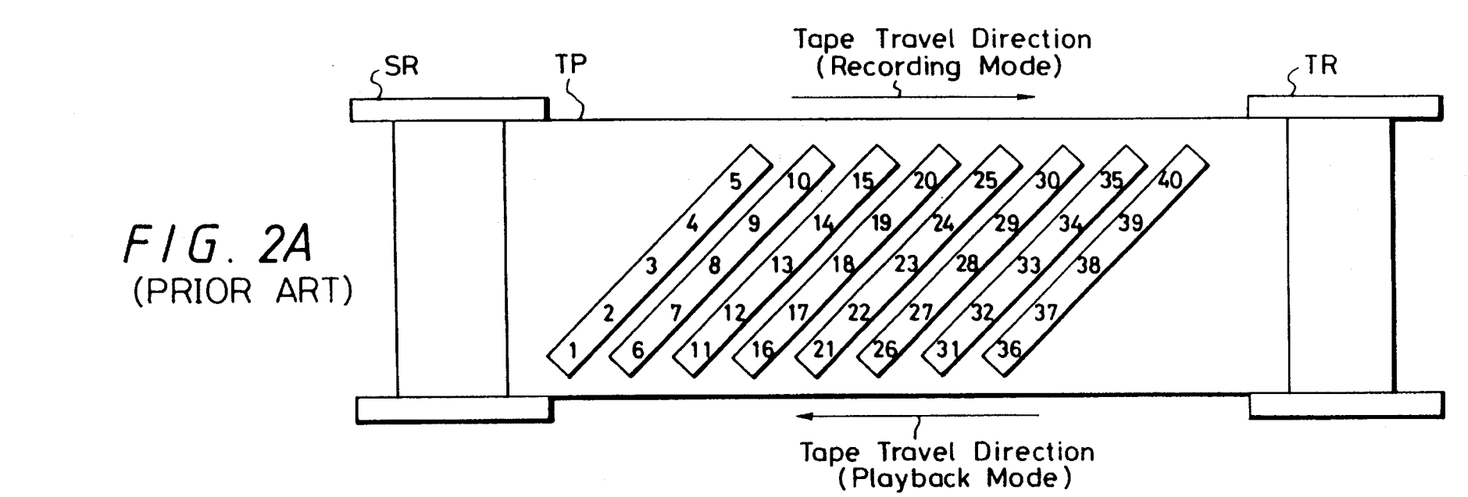
FIGS. 2A to 2C are diagrams used to explain the disadvantages encountered with a conventional magnetic recording and reproducing apparatus, respectively.
Figure 2B:
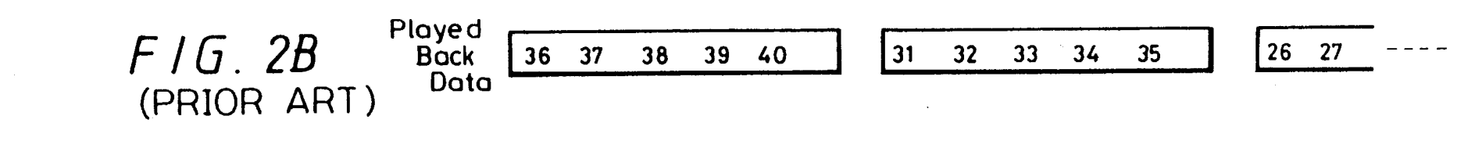

Also, let us consider the case that received data 1 to 40 are sequentially recorded on respective slant tracks at every five data from left to right and also from bottom to top of the slant tracks on a magnetic tape by the above-mentioned magnetic recording and reproducing apparatus as shown in FIG. 2A. Because the received data thus recorded must be reproduced rapidly and transmitted to the ground station, the magnetic tape is not rewound and is transported in the opposite direction at the same speed as that of the recording mode. Then, when recorded data is reproduced at variable speed by a rotary magnetic head that can be displaced in the direction substantially perpendicular to the slant tracks, received data are reproduced in the same order as that of the recording mode in the slant tracks because the rotational direction of the rotary magnetic head is the same as that of the recording mode but reproduced data become discontinuous on the whole of the slant tracks as shown in FIG. 2B.

Figure 2C:
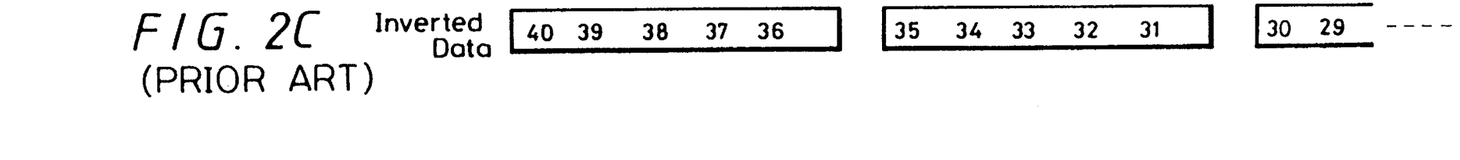

Therefore, when reproduced data are temporarily stored in a memory and read out in the opposite order, continuous data can be obtained on the whole as shown in FIG. 2C, which requires extra time to write and read data in and from the memory.

It is customary that a conventional data recording apparatus (data recorder) records and reproduces data in a so-called multi-track system in which a plurality of tracks is formed in the longitudinal direction of a magnetic tape serving as a recording medium and data are recorded in these tracks.

When the multi-track system is utilized, data can be recorded and reproduced at an arbitrary speed with ease, and also a so-called reverse direction data reproduction can be carried out with ease in which data is reproduced while the magnetic tape is transported in the direction opposite to that of the recording mode.

The aforesaid reverse direction data playback is utilized in the following case.

Figure 3:
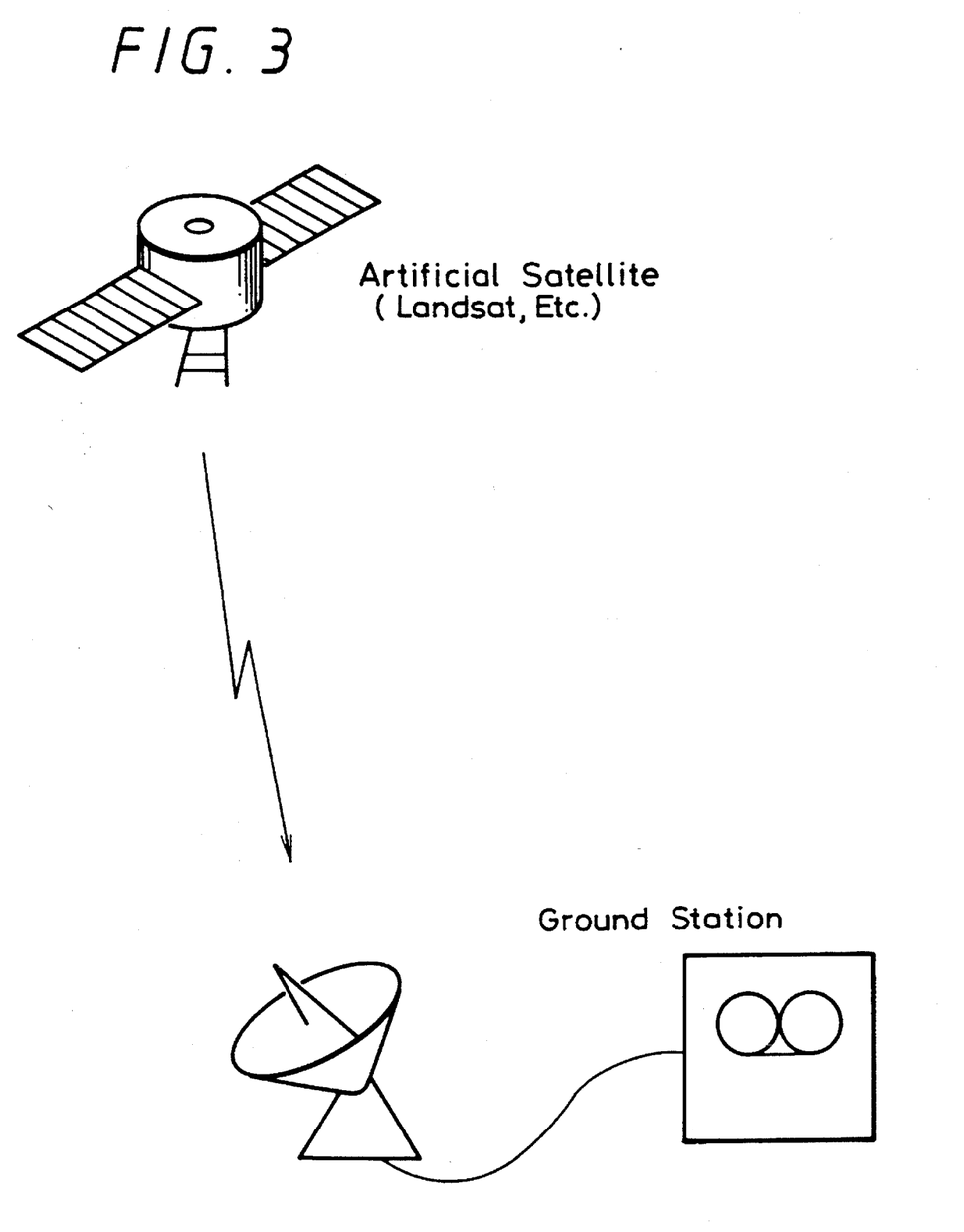
FIG. 3 is a diagram of a communication executed between an artificial satellite and a ground station to which a data recording apparatus of the present invention is applied.

FIG. 3 shows the state of a communication between an artificial satellite and a ground station. The artificial satellite shown in FIG. 3 is a resource observation satellite such as LANDSAT or the like. The artificial satellite records various data of digital system picked up by a camera mounted thereon, e.g., video data on a data recorder and transmits this information to the ground station in the form of a radio signal.

In that case, to save time, the above-mentioned artificial satellite reproduces data recorded on the data recorder while the tape is not rewound, i.e., the artificial satellite carries out the aforesaid reverse direction playback and transmits reproduced data to the ground station. Accordingly, data sequence received by the ground station is in the opposite order to that of the recording mode. Further, data speed of data to be transmitted may be varied in accordance with an instruction from the ground station.

As described above, the reverse direction data playback has heretofore been carried out by the multi-track system data recorder. While the multi-track system data recorder can reproduce data at an arbitrary data speed and effect the reverse direction data playback with ease, the multi-track system data recorder is extremely low in recording density as compared with a helical-scan system data recorder that records data on the longitudinal direction of the tape in a helical-scan fashion similar to the recording system of a VTR (video tape recorder) or the like.

For the helical-scan system data recorder, there is proposed a method of playing back a signal in the reverse direction as is described in Japanese laid-open patent publication No. 62-274991. Although data whose sequence is reversed at every field or frame is reconverted in the original data sequence when the data recorder plays back only video data, the data recorder must handle arbitrary data in addition to video data. Hence, the above-mentioned reverse direction signal playback method cannot be applied to the data recorder directly.

Further, the helical-scan system data recorder cannot reproduce data at an arbitrary data speed. Therefore, in order that the data recorder can reproduce data at desired data speed, data that had been recorded on the magnetic tape at data speed inherent in the data recorder is reproduced, and then the above data speed must be converted into an arbitrary data speed by utilizing a buffer memory of a large capacity.

Objects and Summary of the Invention

It is an object of the present invention to provide an improved magnetic recording and reproducing apparatus in which recorded information is rapidly reproduced without deteriorating the continuity of the order of recorded information.

It is another object of the present invention to provide a data recording apparatus and a data reproducing method thereof in which data can be played back in the reverse direction although data of a digital system is recorded and reproduced in a helical-scan system.

It is a further object of the present invention to provide a data recording apparatus and a data reproducing method thereof in which data can be reproduced at arbitrary data speed with ease.

It is yet a further object of the present invention to provide a data recording apparatus and a data reproducing method thereof in which an access time can be reduced.

According to a first aspect of the present invention, there is provided a magnetic recording and reproducing apparatus which comprises tape transport means of a dual capstan type for transporting a magnetic tape, a tape guide drum housing therein a rotary magnetic head for forming slant tracks on the magnetic tape and being rotated so as to wrap the magnetic tape in a predetermined angular range, and tape tension detecting means being provided in a supply reel side and a take-up reel side, wherein the tape guide drum is rotated both in positive and opposite directions each time the magnetic tape is transported both in positive and opposite directions by the tape transport means, and back tension torques of reel motors for rotating the supply reel and the take-up reel are controlled in response to detected outputs of the supply reel side and the take-up reel side tape tension detecting means each time the magnetic tape is transported both in the positive and opposite directions.

According to a second aspect of the present invention, there is provided a data recording apparatus which comprises data wherein reproducing means for reproducing data, the data is recorded on a magnetic tape along a slant direction with respect to a longitudinal direction by a magnetic tape transport of a predetermined direction and a rotation of a recording head in a predetermined direction. A synchronizing signal is inserted into the data in response to a predetermined data length for establishing a synchronization upon playback, in the sequential order opposite to that of the recording mode by a magnetic tape transport opposite from that of the predetermined direction and a rotation of a recording head opposite to the predetermined direction. The apparatus also provides the data as reproduced data with data inverting means for inverting the sequential order of the reproduced data at every data length corresponding to the synchronizing signal, and data converting means for synchronizing the reproduced data by utilizing the synchronizing signal contained in the reproduced data and converting the reproduced data inverted in the same sequential order as that of the recording mode.

According to a third aspect of the present invention, there is provided a data recording apparatus which comprises data wherein reproducing means for reproducing data, the data is recorded on a magnetic tape along a slant direction with respect to a longitudinal direction by a magnetic tape transport of a predetermined direction and a rotation of a recording head in a predetermined direction. A synchronizing signal inserted into the data in response to a predetermined data length for establishing a synchronization upon playback, in the sequential order different from that of the recording mode by a magnetic tape transport opposite to that of the predetermined direction and a rotation of a recording head opposite to the predetermined direction. The apparatus also provides the data as reproduced data, with data converting means for synchronizing the reproduced data by utilizing the synchronizing signal contained in the reproduced data and converting the reproduced data inverted in the same sequential order as that of the recording mode.

In accordance with a fourth aspect of the present invention, there is provided a reproducing method of a data recording apparatus which comprises the steps of reproducing data, whereby the data is recorded on a magnetic tape along a slant direction with respect to a longitudinal direction by a magnetic tape transport of a predetermined direction and a rotation of a recording head in a predetermined direction. A synchronizing signal is inserted into the data in response to a predetermined data length for establishing a synchronization upon playback, in the sequential order opposite to that of the recording mode by a magnetic tape transport opposite to that of the predetermined direction and a rotation of a recording head opposite to the predetermined direction and. The apparatus also provides the data as reproduced data by inverting the sequential order of the reproduced data at every data length corresponding to the synchronizing signal, and synchronizing the reproduced data by utilizing the synchronizing signal contained in the reproduced data and converting the reproduced data inverted in the same sequential order as that of the recording mode.

In accordance with a fifth aspect of the present invention, there is provided a reproducing method of a data recording apparatus which comprises the steps of reproducing data, whereby the data is recorded on a magnetic tape along a slant direction with respect to a longitudinal direction by a magnetic tape transport of a predetermined direction and a rotation of a recording head in a predetermined direction. A synchronizing signal is inserted into the data in response to a predetermined data length for establishing a synchronization upon playback, in a sequential order different from that of the recording mode by a magnetic tape transport opposite to that of the predetermined direction and a rotation of a recording head opposite to the predetermined direction. The apparatus also provides the data as reproduced data, a means for synchronizing the reproduced data by utilizing the synchronizing signal contained in the reproduced data, a means for converting the reproduced data inverted in the same sequential order as that of the recording mode.

The above and other objects, features, and advantages of the present invention will become apparent from the following detailed description of illustrative embodiments thereof to be read in conjunction with the accompanying drawings.

DETAILED DESCRIPTION OF THE PREFERRED EMBODIMENTS

The present invention will now be described in detail with reference to the drawings.

Figure 4:
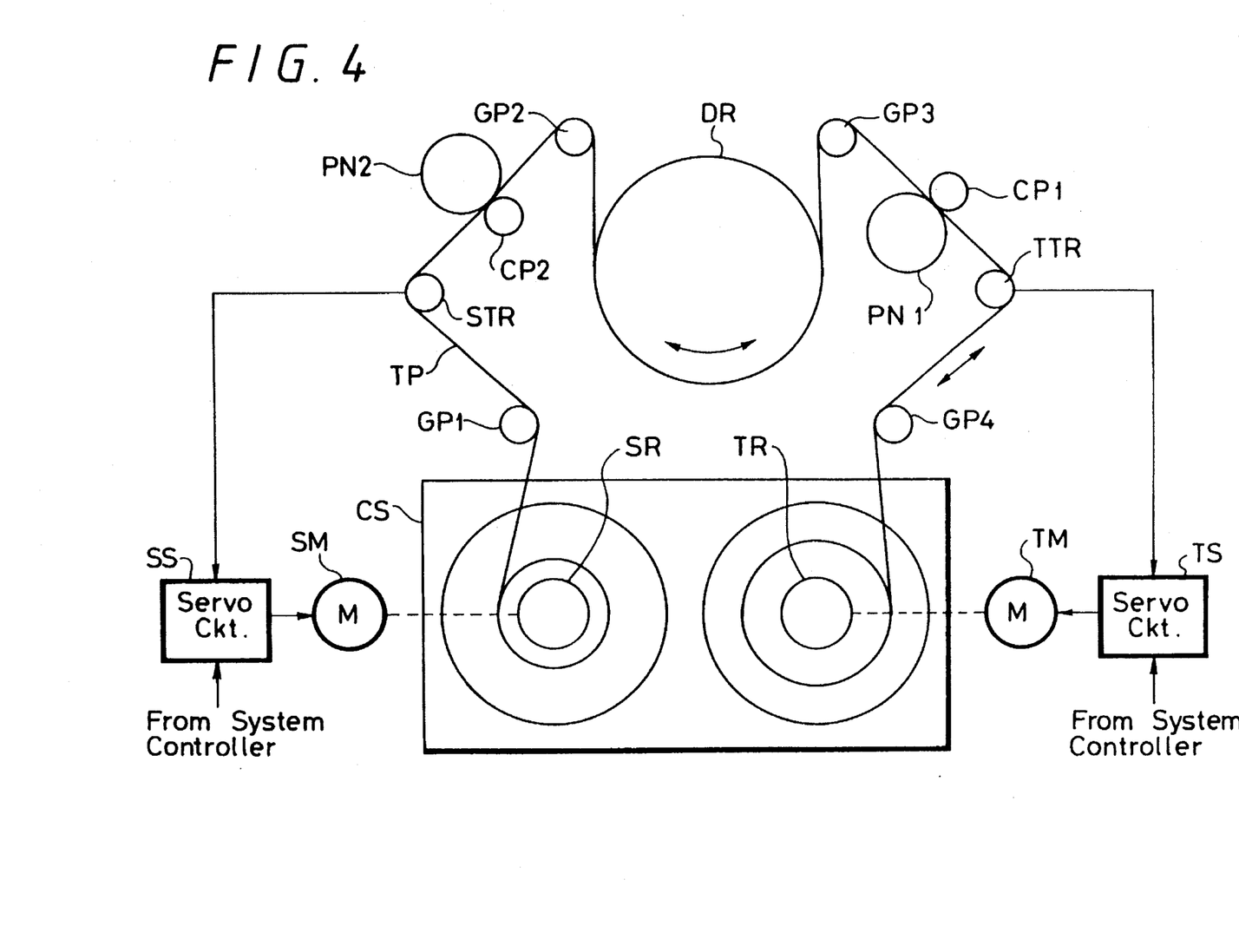
FIG. 4 is a schematic diagram showing a magnetic recording and reproducing apparatus according to an embodiment of the present invention.

FIG. 4 is a schematic diagram showing an overall arrangement of a magnetic recording and reproducing apparatus according to an embodiment of the present invention. Referring to FIG. 4, there is provided a video tape cassette CS in which there are provided a supply reel SR and a take-up reel TR. A magnetic tape TP is wound on these supply and take-up reels SR and TR. The supply reel SR and the take-up reel TR are rotated by reel motors SM and TM of the magnetic recording and reproducing apparatus, respectively. The reel motors SM and TM are driven under the control of servo circuits SS, TS.

A tape guide drum DR comprises an upper rotary drum and a lower rotary drum or a pair of stationary drum and an intermediate rotary drum, though not shown. In any case, one or a plurality of rotary magnetic heads are attached to the intermediate portion of the rotary drum or upper or lower edge portion of the stationary drum side, though not shown.

A pair of capstans CP1, CP2 are provided on the take-up reel TR side and the supply reel SR side, respectively, and rotated by a common or respective capstan motors, though not shown. Facing the capstans CP1 and CP2, there are provided a pair of pinch rollers PN1, PN2 which transport the magnetic tape TP in cooperation with the capstans CP1, CP2, respectively. When the magnetic tape TP is transported in the positive direction, the pinch roller PN1 is brought in rotatable contact with the capstan CP1. When the magnetic tape TP is transported in the opposite direction, the pinch roller PN2 is brought in rotatable contact with the capstan CP2.

Tension regulators STR, TTR are provided in the supply reel SR side and the take-up reel TR side, respectively. The tension regulators STR, TTR detect tape tensions of the supply reel SR side and the take-up reel TR side when the magnetic tape TP is transported in the positive direction and in the reverse direction and supply the servo circuits SS, TS with detected tape tensions.

When the magnetic tape TP travels in the positive direction, the magnetic tape TP supplied from the supply reel SR is transported via a tape guide GP1, the tension regulator STR, a tape guide GP2, the tape guide drum DR, a tape guide GP3, the capstan CP1, the pinch roller PN1, the tension regulator TTR and a tape guide GP4, in that order, and then wound on the take-up reel TR. When the magnetic tape TP travels in the reverse direction, the magnetic tape TP supplied from the take-up reel TR is transported via the tape guide GP4, the tension regulator TTR, the tape guide GP3, the tape guide drum DR, the tape guide GP2, the capstan CP2, the pinch roller PN2, the tension regulator STR and the tape guide GP1, in that order and then wound on the supply reel SR.

The servo circuits SS, TS are responsive to control signals supplied thereto from a system controller that might include a central processing unit (CPU), not shown, to supply the reel motors SM, TM with a winding torque and a back tension torque obtained in the respective modes such as when the magnetic tape TP is transported at constant speed in the positive direction, the magnetic tape TP is transported at constant speed in the reverse direction, the magnetic tape TP is transported in ten fast forward mode (FF) and when the magnetic tape TP is rewound. A fixed magnetic head and other tape guides need not be described herein and are not shown, for simplicity.

Figure 5:
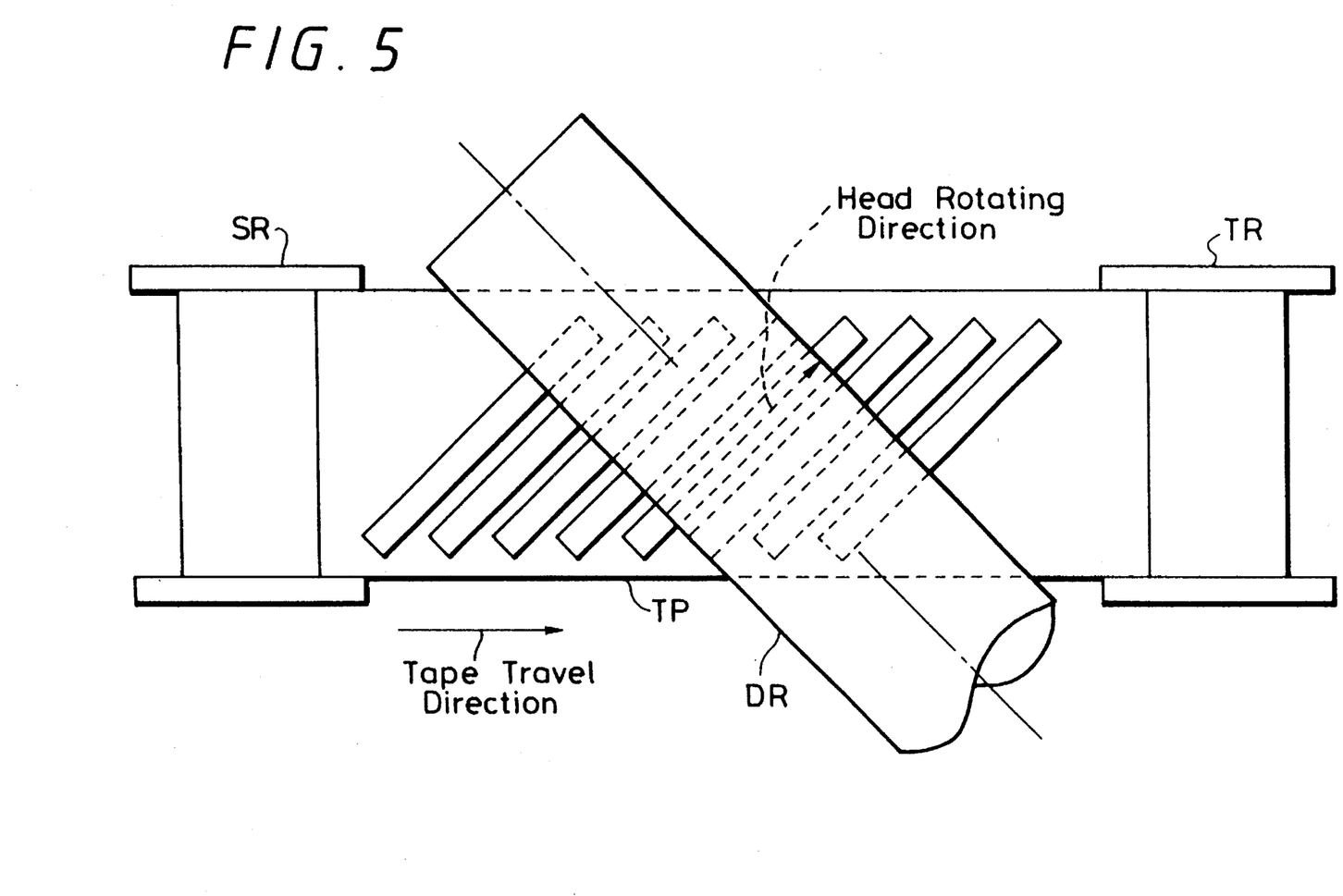
FIG. 5 is a diagram used to explain the positive direction recording/reproducing mode according to the embodiment of the present invention.
Figure 6:
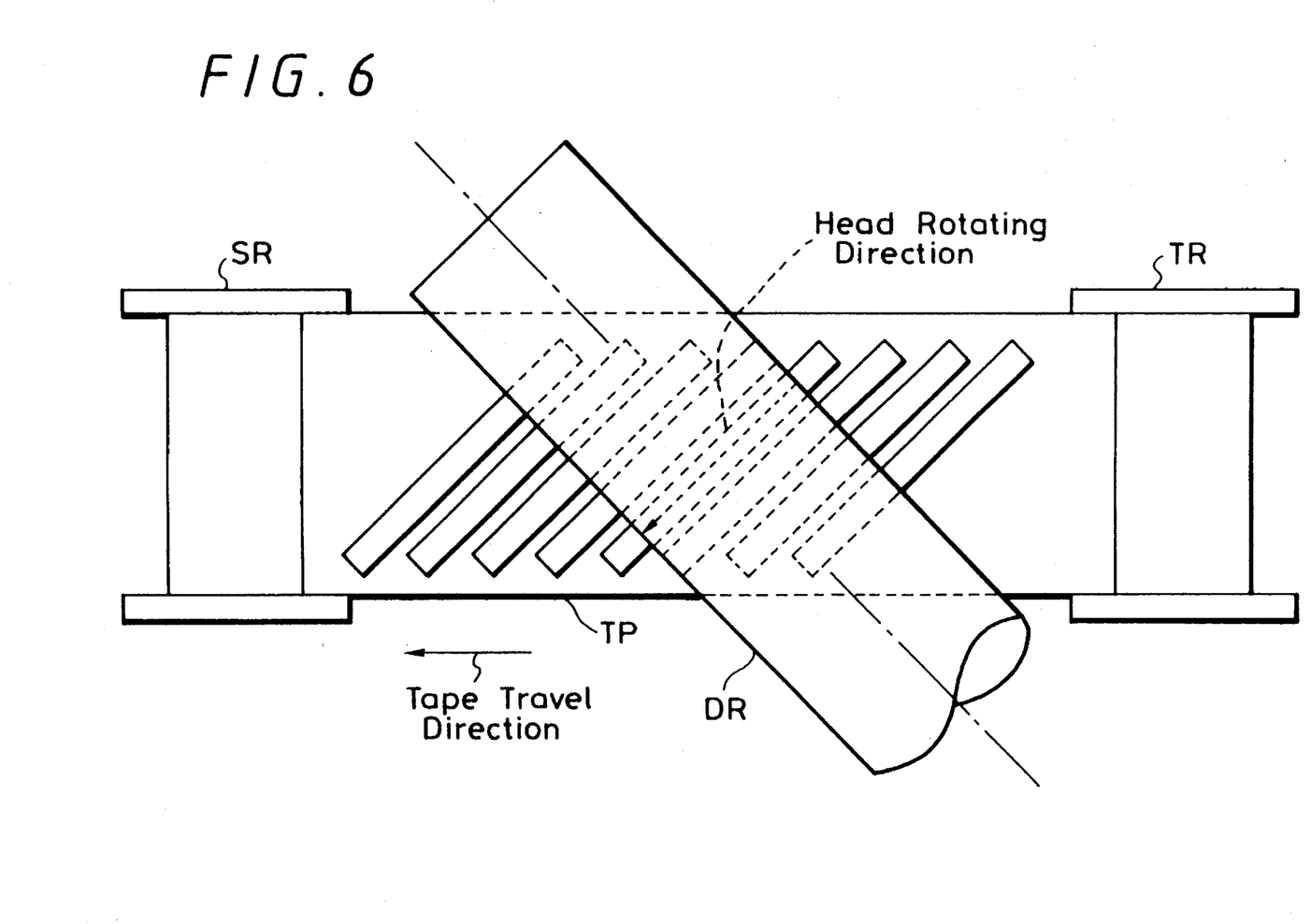
FIG. 6 is a diagram used to explain the reverse direction recording/reproducing mode according to the embodiment of ten present invention.

A rotary drum of the tape guide drum DR is rotated by a drum motor, not shown, and this drum motor is driven under the control of a servo circuit, not shown. As shown in FIGS. 5 and 6, each time the magnetic tape TP is transported in the positive direction and in the reverse direction, the rotary drum, i.e., the rotary magnetic head also is rotated in the positive direction and in the reverse direction. Thus, the rotary magnetic head is caused to scan the slant tracks on the magnetic tape TP from bottom to top or from top to bottom. The rotary magnetic head can be rotated in the positive direction when the magnetic tape TP is transported in the reverse direction.

Therefore, when the magnetic tape TP is transported in the positive direction and the tape guide drum DR is rotated in the positive direction by the magnetic recording and reproducing apparatus of this embodiment as shown in FIG. 5, received data 1 to 40 are sequentially recorded in data blocks of five on respective slant tracks on the magnetic tape TP from left to right and from bottom to top as shown in FIG. 2A. Thereafter, as shown in FIG. 6, the magnetic tape TP is transported at the same speed as that of the recording mode in the reverse direction and the tape guide drum DR is rotated in the reverse direction to reproduce data, whereby continuous data whose sequence is opposite to that in the recording mode is reproduced as shown in FIG. 2C.

Conversely, when the magnetic tape TP is transported in the reverse direction and the tape guide drum DR is rotated in the reverse direction as shown in FIG. 6, received data 1 to 40 are sequentially recorded in data blocks of five on respective slant tracks on the magnetic tape TP from right to left and from top to bottom. Thereafter, as shown in FIG. 5, the magnetic tape TP is transported at the same speed as that of the recording mode in the positive direction and the tape guide drum DR is rotated in the positive direction to reproduce data, whereby continuous data whose sequence is opposite to that in the recording mode is reproduced.

As described above, according to the present invention, there is provided the magnetic recording and reproducing apparatus which comprises the tape transport means and the tape guide drum housing therein the rotary magnetic head for forming the slant tracks on the magnetic tape and which is guided so as to wind the magnetic tape thereon in the predetermined angular range. Since the tape guide drum is rotated in the positive and reverse directions each time the magnetic tape is transported in the positive and reverse directions by the tape transport means, data can be played back rapidly without interrupting the continuity of the order of recording the magnetic recording information.

Furthermore, wear of the rotary magnetic head, the fixed magnetic head, the tape guide of the tape transport system or the like can be reduced and the deterioration of the magnetic tape can be reduced, thereby improving durability of the magnetic recording and reproducing apparatus considerably.

A data recording apparatus and a data reproducing method thereof according to another embodiment of the present invention will be described below.

According to the data recording apparatus and the data reproducing method of the present invention, the above-mentioned reverse direction data reproduction is made possible by using the existing format such as an ID-1 or the like.

FIG. 3 is the a diagram of the communication executed between the artificial satellite and the ground station to which there can be applied the data recording apparatus and the data reproducing method of the present invention, as earlier noted.

In FIG. 3, the artificial satellite records video data on the data recorder in the sequential order (A) at every segment. Also, this artificial satellite effects the reverse direction in the sequential order (B) and transmits data sequence opposite to that of the recording mode to the ground station shown in FIG. 3.

$$a_1, a_2, a_3, \ldots, a_{n-1}, a_n \quad \ldots (A)$$

$$a_n, a_{n-1}, \ldots, a_3, a_2, a_1 \quad \ldots (B)$$

where $a_i$ represents bits and $n$ is an integer.

When the sequential order of data is illustrated, only the sequential order of data itself is shown for simplicity. When codes such as an error correction code or the like are added to the data, such codes are omitted.

Figure 7:
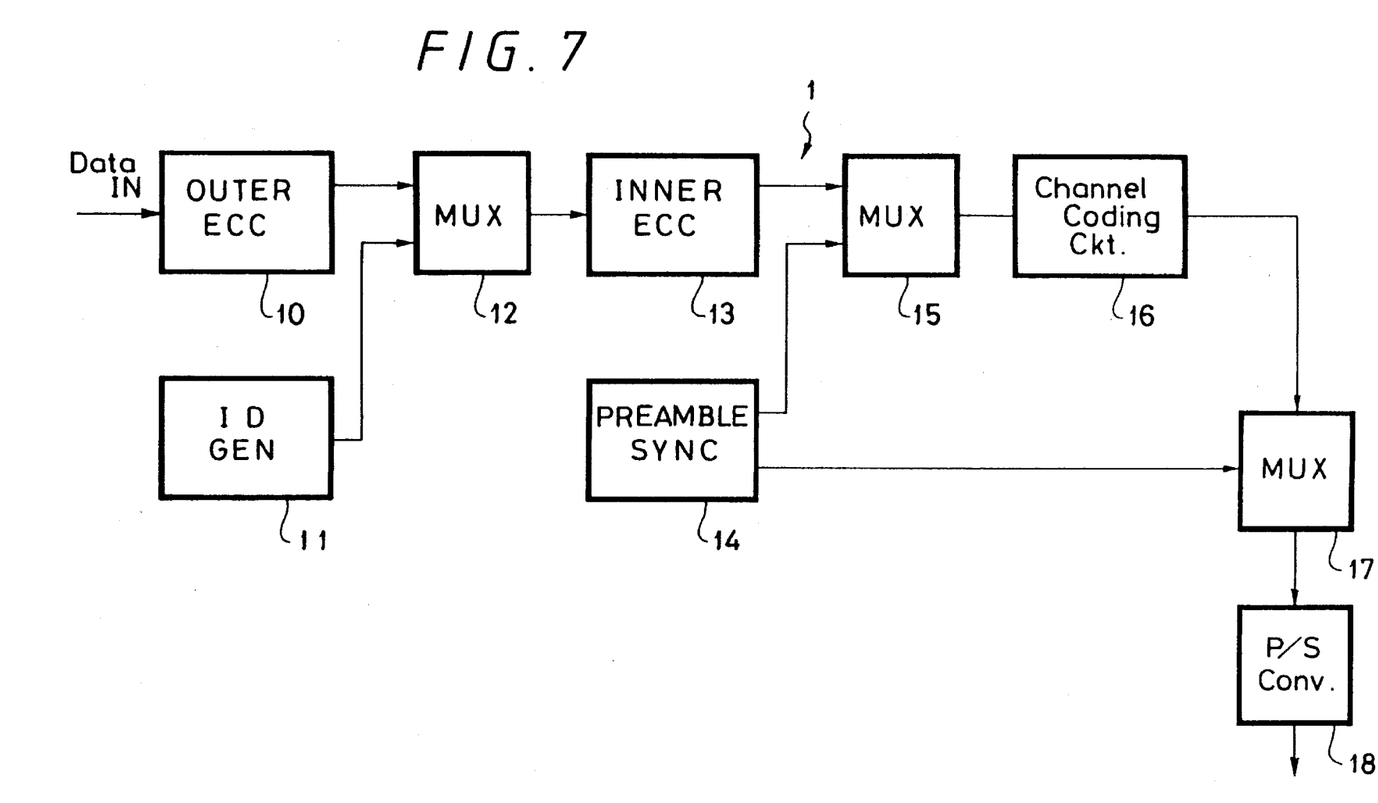
FIG. 7 is a block diagram showing a circuit arrangement of a recording system of a data recording apparatus according to another embodiment of the present invention.

FIG. 7 is a block diagram showing an arrangement of a recording system 1 of the data recording apparatus (data recorder) according to the present invention.

When data is recorded on a magnetic tape, the addition of an error correction code and the channel coding become indispensable for such data recording.

The recording system 1 of this data recorder adds the error correction code to the data that is recorded at the segment unit as shown in (A), effects the channel coding and adds runup (RUNUP) (preamble) sequence and a synchronizing (SYNC) pattern to the data so that the data thus processed become a recording signal that is recorded on the magnetic tape.

As shown in FIG. 7, an outer code adding circuit (OUTER ECC) 10 adds an error correction (ECC) code based on an outer code (OUTER ECC) to input data. An ID generating circuit (ID GEN) 11 generates an ID signal that is added to data output from the outer code adding circuit 10. A first multiplexing circuit (MUX) 12 multiplexes the data output from the outer code adding circuit 10 and the ID signal output from the ID generating circuit 11.

An inner code adding circuit (INNER ECC) 13 further adds an error correction code based on an inner code (INNER ECC) to data output from the multiplexing circuit 12. A preamble/sync. signal generating circuit (PREAMBLE SYNC) 14 generates a preamble signal and a sync. signal that are added to data output from the inner code adding circuit 13. A second multiplexing circuit (MUX) 15 multiplexes the output from the inner code adding circuit 13 and the sync. signal output from the preamble/sync. signal generating circuit 14.

A channel coding circuit 16 converts data output from the second multiplexing circuit 15 into data of the form matched with characteristics of a recording and reproducing system (not shown). A third multiplexing circuit (MUX) 17 multiplexes data processed by the channel coding circuit 16 and the preamble signal output from the preamble/sync. signal generating circuit 14. A parallel-to-serial converting circuit (P/S CONV) 18 converts parallel data output from the third multiplexing circuit 17 into serial data and outputs the same to the recording and reproducing system (not shown).

Operation of the recording system 1 of this data recorder will be described below.

Referring to FIG. 7, data input to the recording system 1 of the data recorder is supplied to the outer code adding circuit 10, in which it is added with an error correction code based on the outer code (i.e., outer code parity) and then input to the first multiplexing circuit 12.

The ID generating circuit 11 generates an ID signal formed of a segment No., a field No., and a sector No., added to every segment data (hereinafter simply referred to as a segment) on a recording medium (not shown). Data output from the outer code adding circuit 10 and the ID signal are multiplexed by the first multiplexing circuit 12 and then input to the inner code adding circuit 13. The inner code adding circuit 13 adds the error correction code (inner code parity) to the data output from the first multiplexing circuit 12 at every segment and inputs the same to the second multiplexing circuit 15.

The preamble/sync. signal generating circuit 14 generates the preamble signal and the sync. signal that are added to the data at every segment. The sync. signal is input to the second multiplexing circuit 15 and the preamble signal is input to the third multiplexing circuit 17. The second multiplexing circuit 15 multiplexes the data output from the inner code adding circuit 13 and the sync. signal and inputs the output data to the channel coding circuit 16.

The channel coding circuit 16 processes the output data of the second multiplexing circuit 15 and inputs the output data thus processed to the third multiplexing circuit 17. The third multiplexing circuit 17 multiplexes the output data of the channel coding circuit 16 and the preamble signal output from the preamble/sync. signal generating circuit 14 and inputs the output data thus multiplexed to the parallel-to-serial converting circuit 18. The parallel-to-serial converting circuit 18 converts the output data of the third multiplexing circuit 17 in the form of parallel to serial data and inputs the output serial data to the recording and reproducing system (not shown). The recording and reproducing system records the output data (recording data) of the parallel-to-serial converting circuit 18 on the magnetic tape (not shown).

Figure 8:
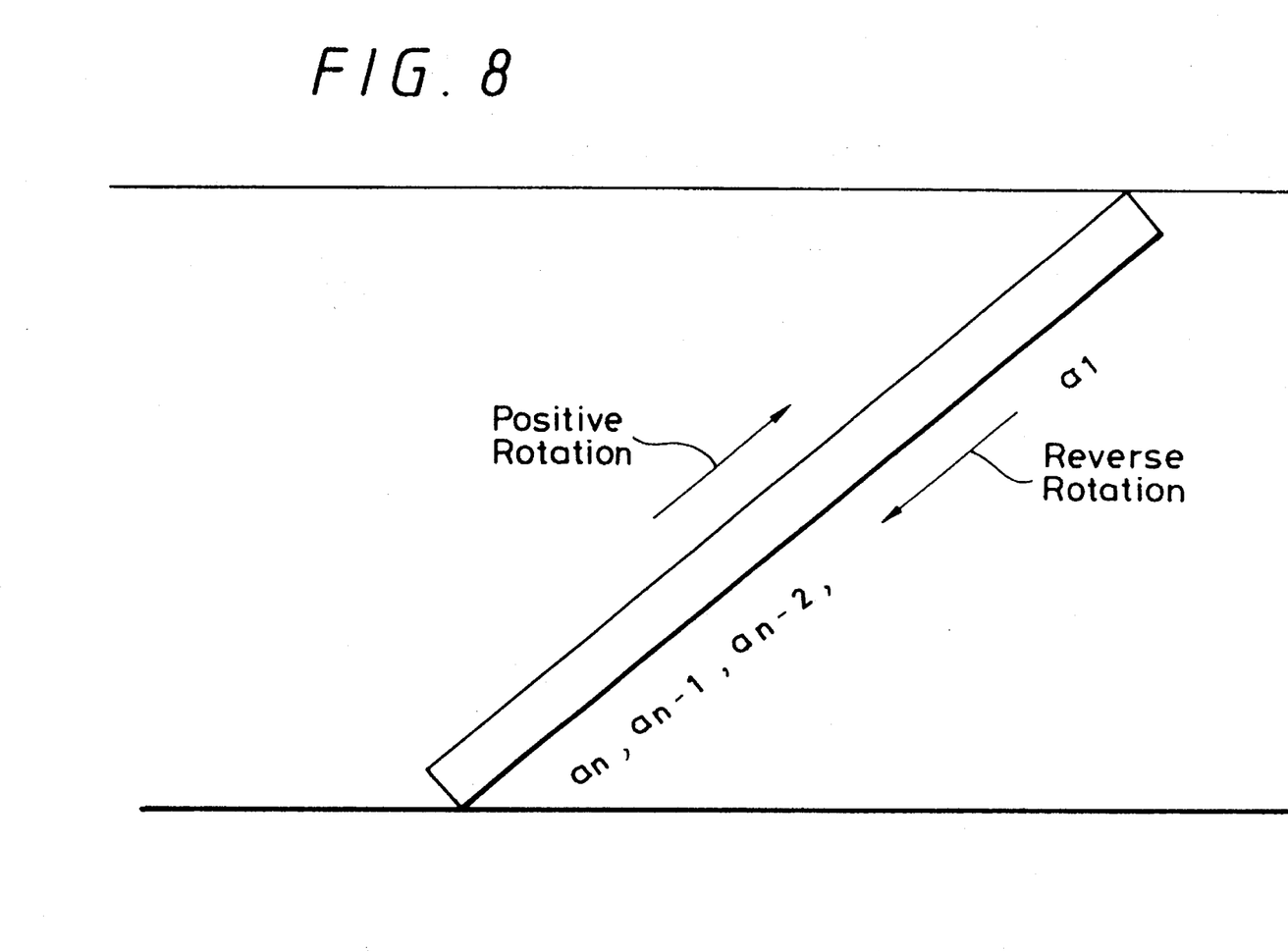
FIG. 8 is a diagram showing a format of recording data on the magnetic tape.

FIG. 8 is a diagram showing a format of the recording data on the magnetic tape. As shown in FIG. 8, the recording data is recorded on the magnetic tape at every segment in the sequential order (A) when the rotary magnetic head is rotated in the positive direction. In actual practice, the RUNUP signal and the SYNC signal are added to the recording data which are then recorded in the form of the following (C):

$$\text{RUNUP, SYNC, ID}, a_1, a_2, a_3, \ldots, a_{n-1}, a_n \quad \ldots (C)$$

A number of recording data of the segment unit are recorded on the magnetic tape. Further, a set of segments of a predetermined number is handled in the unit of tracks.

As described above, operation is executed when the recording system 1 of the data recorder processes the input data after the recording and reproducing system records of such data on the magnetic tape has ended.

Figure 9:
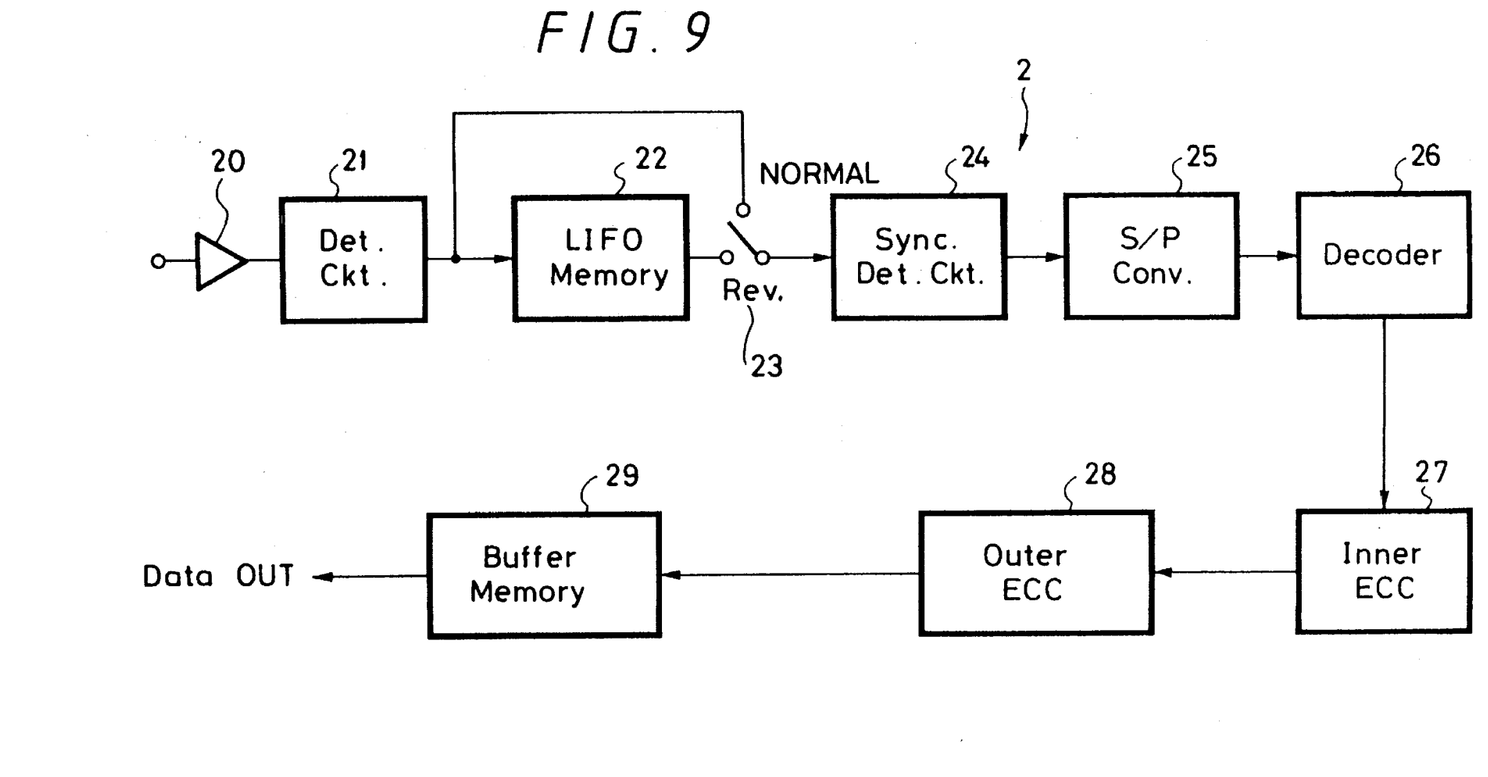
FIG. 9 is a block diagram showing a circuit arrangement of a reproducing system of the data recording apparatus according to another embodiment of the present invention.

FIG. 9 is a block diagram showing a circuit arrangement of a reproducing system 2 of the data recording apparatus (data recorder) according to the present invention.

The reproducing system 2 of the data recorder reproduces data in a reverse direction playback fashion that had been transmitted from the artificial satellite shown in FIG. 3, for example, and had been recorded on the magnetic tape by the recording system 1 of the data recorder, decodes the reproduced data and error-corrects the same to thereby reproduce original data in the unit of tracks. The above-mentioned data is recorded on the magnetic tape in the form of (D) which follows:

$$a_n, a_{n-1}, \ldots, a_3, a_2, a_1, \text{(ID), (SYNC), (RUNUP)} \quad \ldots (D)$$

In the above-mentioned (D), (ID), (SYNC) and (RUNUP) respectively denote the ID signal, the SYNC signal and the RUNUP signal which are reversed in order by the reverse direction data reproduction.

A recording and reproducing system head (not shown) used when the reverse direction data reproduction is effected that accurately traces the data on the magnetic tape in exactly the opposite direction to that of the recording mode to read out data. When a dynamic tracking technique in which only the tape travel direction is reversed and the head rotating direction is the same as that of the recording mode is utilized, the reproducing system 2 may be arranged such that a LIFO (last-in first-out) memory 22, which will be described later on, is omitted. However, a method of the present invention in which the head also is rotated in the reverse direction to thereby effect the reverse direction data reproduction whereby the head arrangement is more advantageous.

Referring to FIG. 9, an amplifier 20 amplifies a reproduced signal played back from the magnetic tape by the recording and reproducing system (not shown). The reproduced signal amplified by the amplifier 20 is detected by a detecting circuit 21 and input to a LIFO memory 22. The LIFO memory 22 is formed of a last-in first-out (LIFO) system memory and reverses the sequential order of the reproduced data at the unit of segments when the reverse direction data reproduction is carried out.

A switch 23 is connected to a contact Rev. (reverse) when the reverse direction reproduction is carried out. The switch 23 is connected to a contact NORMAL when the normal data reproduction is carried out (reproduction carried out under the condition that the magnetic tape is transported in the same direction as that of the recording mode).

A sync. detecting circuit 24 is adapted to detect a synchronization of the output data from the reproducing system 2 of the data recorder on the basis of the RUNUP signal.

A serial-to-parallel converting circuit (S/P CONV) 25 is adapted to convert the serial data output from the reproducing system 2 of the data recorder into parallel data.

A decoder 26 is adapted to process the output data of the serial-to-parallel converting circuit 25 in a fashion opposite to that of the above-mentioned channel coding circuit 16 and inputs the data thus processed to an inner code error correction circuit 27. The inner code error correction circuit (INNER ECC) 27 error-corrects the output data of the decoder 26 on the basis of the inner code parity added by the inner code adding circuit 13 (see FIG. 7), and inputs the data thus error-corrected to an outer code error correction circuit (OUTER ECC) 28.

The outer code error correction circuit 28 error-corrects the output data of the inner code error correction circuit 27 on the basis of the outer code parity added by the outer code adding circuit 10, and inputs the data thus error-corrected to a buffer memory 29. The buffer memory 29 processes the output data of the outer code error correction circuit 28 at the unit of tracks to obtain data of the data sequence provided in the recording mode.

Operation done by the reproducing system 2 of the data recorder when the reverse direction data reproduction is carried out will be described below.

As shown in FIG. 9, a reproduced signal input to the reproducing system 2 of the data recorder from the recording and reproducing system is amplified by the amplifier 20 and detected by the detecting circuit 21, thereby being converted into reproduced data of the above-mentioned form (D). Accordingly, this reproduced data cannot be synchronized or corrected in error inasmuch as the reproduced data is not modified. Hence, the reproduced data is reconverted into the data of the same data sequence as that of the recording mode at every segment by the LIFO memory 22, thereby making it possible to execute the succeeding processing.

The switch 23 is connected to the contact Rev. so that the reproduced data processed by the LIFO memory 22 is input to the sync. detecting circuit 24 of the data recorder. The switch 23 of the data recorder is connected to the contact NORMAL when the normal data reproduction is carried out so that data, not processed by the LIFO memory 22, is input to the sync. detecting circuit 24 of the data recorder. The reason for this is that, when the normal data reproduction is carried out, the order of the data sequence of the reproduced data need not be reversed by the LIFO memory 22.

The reproduced data is input to the LIFO memory 22, in which the order of the data sequence is reversed at the unit of segments to provide the data sequence shown in the above-mentioned form (C).

The succeeding processing in the reproducing system 2 of the data recorder becomes opposite to that executed in the recording system 1 of the data recorder. More specifically, the sync. detecting circuit 24 of the data recorder synchronizes data on the basis of the SYNC signal of the output data from the LIFO memory 22, and supplies clocks used in respective parts of the reproducing system 2 of the data recorder. Serial output data of the LIFO memory 22 is converted into parallel data by the serial-to-parallel converting circuit 25 and then input to the decoder 26.

The decoder 26 decodes the output data of the serial-to-parallel converting circuit 25 and outputs the data thus processed to the inner code error correction circuit 27. The output data of the decoder 26 is error-corrected by the inner code error correction circuit 27 and the outer code error correction circuit 28, thereby original data being reproduced. The original data are sequentially stored in the buffer memory 29. The buffer memory 29 re-arranges the sequential order of the data in the segment so that the sequential order of the data becomes the same one as that in the recording mode. Operation executed by the reproducing system 2 of the data recorder when the reverse direction data reproduction is effected is described above.

Figure 10:
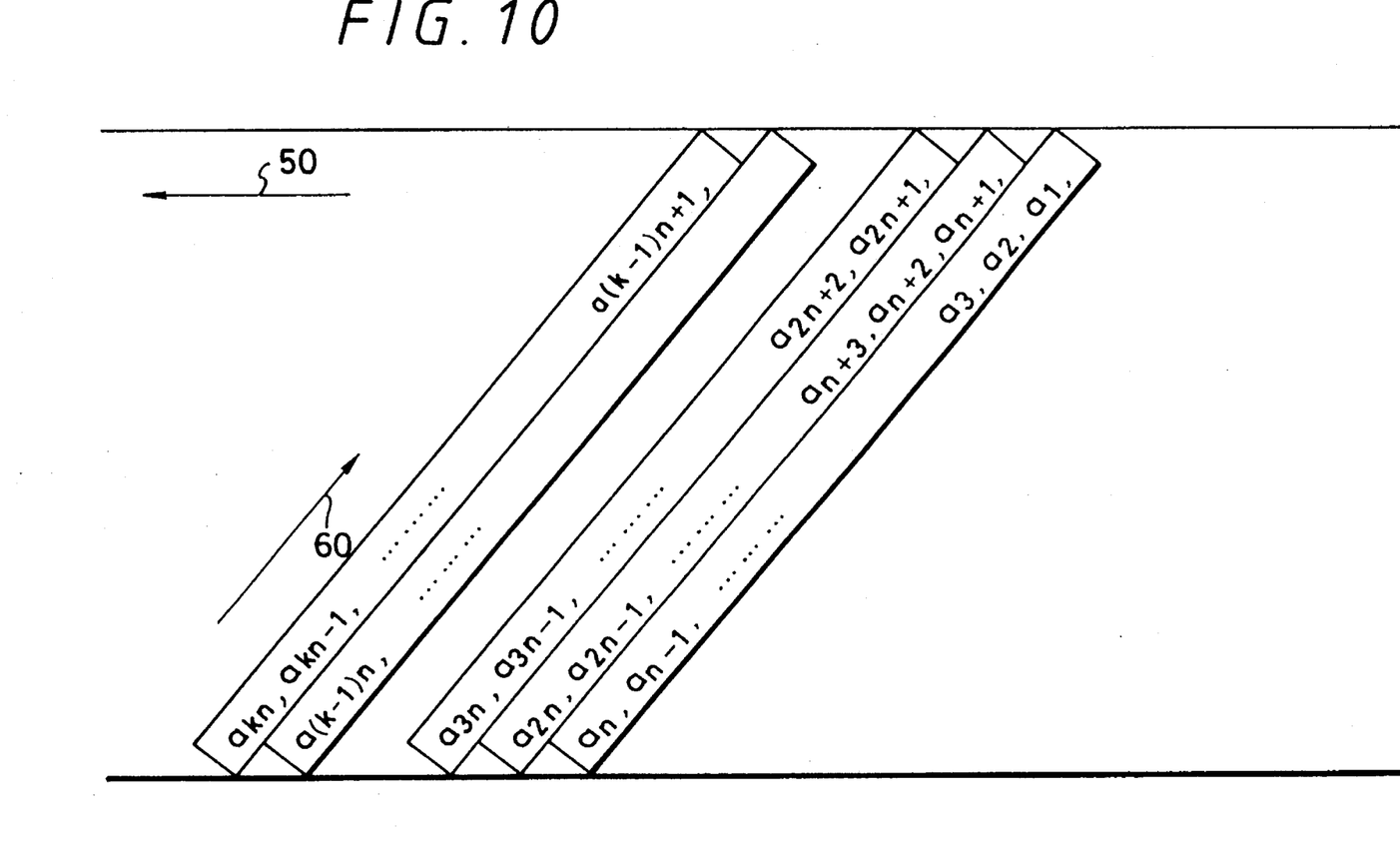
FIG. 10 is a diagram showing a recording format by which data is recorded on the magnetic tape in a unit of tracks.

FIG. 10 is a diagram showing a recording format by which data is recorded on the magnetic tape at the unit of tracks. As shown in FIG. 10, one track is formed of (k) segments having (nk) bits in total.

In FIG. 10, data reproduced in the reverse direction data reproduction mode by the artificial satellite shown in FIG. 3, for example, is written in the tape under the condition that the magnetic tape is transported in the direction shown by an arrow 50 and the magnetic head is rotated in the direction shown by an arrow 60. Therefore, when such data is recorded in the positive direction by the recording system 1 of the data recorder, the data is recorded on the magnetic tape in the sequential order (E) expressed as:

$$\text{RUNUP, SYNC, ID, } a_{nk}, a_{nk-1}, \ldots, a_{(k-1)n+1}, \ldots, \text{RUNUP,} \\ \text{SYNC, ID, } a_n, a_{n-1}, \ldots, a_2, a_1 \quad \ldots \text{(E)}$$

In the above-mentioned (E), ID represents the content corresponding to each segment.

Because the magnetic tape is transported in the direction opposite to the arrow 50 direction and the magnetic head is rotated in the direction opposite to the arrow 60 direction in FIG. 10 when the recording data is reproduced in the reverse direction data reproduction mode, reproduced data is input to the reproducing system 2 of the data recorder in the sequential order (F) expressed as:

$$a_1, a_2, \ldots, a_{n-1}, a_n, \text{(ID), (SYNC), (RUNUP), } a_{n+1} \ldots, a_{(kn-1)n}, \\ a_{nk-1}, a_{nk}, \text{(ID), (SYNC), (RUNUP), } a_{(k-1)n+1}, \ldots, \quad \ldots \text{(F)}$$

In the above-mentioned (F), the ID signal, the SYNC signal and the RUNUP signal are reversed because the reverse direction data reproduction was carried out. Hence, the synchronization cannot be established by the above arrangement.

In order to solve the aforementioned problem, the sequential order of data is reversed at the unit of segments by the LIFO memory 22, whereby the output from the LIFO memory 22 is input to the sync. detecting circuit 24 in the sequential order (G) expressed as:

$$\text{SYNC, ID}, a_n, a_{n-1}, \ldots, a_2, a_1, \ldots, \text{SYNC, ID}, \ldots, a_{nk}, a_{nk-1}, \ldots, a_{(k-1)n+1} \quad \ldots (G)$$

Incidentally, the RUNUP signal is removed by the detecting circuit 21. In the output data of the LIFO memory 22, the ID signal and the SYNC signal corresponding to the respective segments are provided in the same sequential order as that in the recording mode. Therefore, the synchronization can be established by the sync. detecting circuit 24. Further, the decoder 26, the inner code error correction circuit 27 and the outer code error correction circuit 28 can effect the decoding and the error correction at the unit of segments.

The SYNC signal is removed from the output of the outer code error correction circuit 28 and data is output in the sequential order (H) given as:

$$\text{ID}, a_n, a_{n-1}, \ldots, a_2, a_1, \ldots, \text{ID}, a_{nk}, a_{nk-1}, \ldots, a_{(k-1)n+1} \quad \ldots (H)$$

The ID signal is removed from this data and this data is input to the buffer memory 29, in which the sequential order of the data sequence thereof is changed in the segment or data is written in the magnetic tape with the same sequential order as that of the recording mode or read out from the magnetic tape with the same sequential order as that of the recording mode. Thus, the sequential order of the data sequence thereof becomes the same as that of the recording mode and then this data is output in the order (I) given as:

$$a_1, a_2, \ldots, a_{n-1}, a_n, \ldots, a_{(n-1)k+1}, \ldots, a_{nk-1}, a_{nk} \quad \ldots (I)$$

The data reproduction executed by the reproducing system 2 of the data recorder is ended as described above.

When the recording system 1 of the data recorder and the reproducing system 2 of the data recorder are arranged as described above, the data can be recorded and reproduced with ease in accordance with the rotation of the magnetic head. Therefore, the data recording apparatus of the helical-scan system can record and reproduce data at arbitrary data speed.

It is sufficient that a capacity of the LIFO memory 22 might be such one as to record data of one segment. Thus, the capacity of the memory becomes about 200 kbytes in the data recording apparatus of the ID-1 format. A memory of such capacity can be obtained with ease. If the memory of such small capacity is utilized, then the dynamic tracking technique need not be utilized.

While the reverse direction data reproduction at the unit of tracks has been described so far, the present invention is not limited to the data reproduction of the track unit and may be applied to data reproduction of the segment unit.

The data recording apparatus of the present invention is not limited to the above-mentioned example and may take various modifications such as application to data recording apparatus using other formats, application to an error correction using either the inner code or outer code, application to an error correction using an error correction code different from the above two inner and outer codes or the like.

As described above, according to the present invention, the data recording apparatus and the reproducing method thereof can effect the reverse direction data reproduction, regardless of the helical-scan system used for the digital data recording and reproduction, and can reproduce data at arbitrary data speeds. Further, the data recording apparatus and the reproducing method thereof need not rewind the tape upon playback and therefore can provide a short access time.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A data recording and reproducing apparatus comprising:

tape transporting means for transporting a tape recording medium in a first direction in a recording mode and in a second direction opposite the first direction in a reproducing mode;

a rotary drum rotating in a predetermined direction in the recording mode for recording a data signal on said tape recording medium in a plurality of tracks in a slant direction with respect to a longitudinal direction of the magnetic tape and said rotary drum rotating in a direction opposite the predetermined direction in the reproducing mode for reproducing the data signal from said tape recording medium to produce a reproduced data signal;

data receiving means for receiving a transmitted data signal having a sequential order opposite a sequential order of an original data signal prior to transmission;

synchronizing signal adding means receiving the transmitted data signal from said data receiving means for adding a synchronizing signal to every first data length of the data signal to be recorded;

first data inverting means for inverting a sequential order of said reproduced data signal at every second data length corresponding to a length of said track;

synchronizing signal detection means for detecting synchronizing signals from an output of said first data inverting means; and second data inverting means for inverting a sequential order of an output signal of said synchronizing signal detection means at every data length corresponding to a data length of the data signal between adjoining two synchronizing signals so as to produce a data signal having a sequential order the same as the sequential order of the original data signal.

2. The data recording and reproducing apparatus according to claim 1, wherein said data signal recorded on said tape recording medium further includes an error correction code and said data recording and reproducing apparatus further includes error correction means for error-correcting said reproduced data on the basis of said error correction code.

3. The data recording and reproducing apparatus according to claim 2, wherein said error correction code used by said error correction means includes at least one of an outer error correction code and an inner error correction code.

4. The data recording and reproducing apparatus according to claim 1, wherein said first data length corresponds to a length of one of said plurality of tracks.

5. The data recording and reproducing apparatus according to claim 1, wherein said first data inverting means comprises a last-in first-out memory.

6. The data recording and reproducing apparatus according to claim 1, wherein said second data inverting means comprises a buffer memory.

7. The data recording and reproducing apparatus according to claim 1, further comprising a switch for connecting the reproduced signal directly to said synchronizing signal detection means and for by-passing said first data inverting means.

8. The data recording and reproducing apparatus according to claim 1, further comprising a serial to parallel converter for converting a serial data signal output from said synchronizing signal detector into a parallel data signal.

9. The data recording and reproducing apparatus according to claim 8, further comprising a decoder for decoding the parallel data signal output from said serial to parallel converter.

* * * * *

UNITED STATES PATENT AND TRADEMARK OFFICE
CERTIFICATE OF CORRECTION

PATENT NO. :   5,481,413
DATED      :   January 2, 1996
INVENTOR(S):   Hideaki KAWADA
               Toshiaki WAKITA It is certified that error appears in the above-indentified patent and that said Letters Patent is hereby corrected as shown below:

Col. 1, line 37, after "from" insert --one--
Col. 2, line 23, change "data" first occurence, to --the--
        line 56, change "Objects and Summary of the Invention" to
            --OBJECTS AND SUMMARY OF THE INVENTION--
Col. 3, line 27, delete "wherein"
same line, after "data," insert --wherein--
        line 48, delete "wherein"
same line, after "data," insert --wherein--
Col. 7, line 1, delete "the" first occurence In the claims:
Col. 14, line 6, after "decoding" delete "-"

Signed and Sealed this

Twentieth Day of May, 1997

BRUCE LEHMAN

Attest:

Attesting Officer          Commissioner of Patents and Trademarks